US012797773B2

(12) United States Patent
Swope et al.

(10) Patent No.: US 12,797,773 B2
(45) Date of Patent: Nov. 17, 2026

(54) IN-PIPE STORMWATER TREATMENT UNIT BEST MANAGEMENT PRACTICE (I-STUB)

(71) Applicant: The United States of America, as represented by the Secretary of the Navy, Arlington, VA (US)

(72) Inventors: Brandon Lawson Swope, San Diego, CA (US); Patrick John Earley, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 179 days.

(21) Appl. No.: 18/979,268

(22) Filed: Dec. 12, 2024

(65) Prior Publication Data

US 2026/0138056 A1 May 21, 2026

Related U.S. Application Data

(60) Provisional application No. 63/722,196, filed on Nov. 19, 2024.

(51) Int. Cl.
*B01D 24/04* (2006.01)
*B01D 24/00* (2006.01)
(Continued)

(52) U.S. Cl.
CPC ......... *B01D 24/042* (2013.01); *B01D 24/002* (2013.01); *B01D 24/007* (2013.01);
(Continued)

(58) Field of Classification Search
None
See application file for complete search history.

(56) References Cited

U.S. PATENT DOCUMENTS 150,164 A * 4/1874 Kacserowsky .......... F23J 3/026 15/171
201,442 A * 3/1878 Page ....................... E02B 13/00 405/40
(Continued)

OTHER PUBLICATIONS

Rem Filters; Triton TT2 Filter; Revel Environmental Manufacturing; Available at https://remfilters.com/tdam-tt2-filter-2/; 2017.
(Continued)

*Primary Examiner* — Robert J Popovics
(74) *Attorney, Agent, or Firm* — Naval Information Warfare; Kyle Eppele; Eric Anderson

(57) ABSTRACT

A filter for removing contaminants from stormwater comprising: a plurality of individual treatment units (ITUs), wherein each ITU includes a perforated filter body having an inlet end and an outlet end, wherein each ITU further includes a filter bag deployed within the perforated body and connected to the inlet end such that all stormwater entering the inlet end is channeled into the filter bag; and a plurality of rigid linkage arms, wherein each rigid linkage arm is configured to connect the inlet end of one ITU to the outlet end of a different ITU so as to form a chain of ITUs and rigid linkage arms, and wherein each linkage arm is configured to connect two given ITUs so as to limit side-to-side movement of the given ITUs with respect to each other.

20 Claims, 5 Drawing Sheets

(51) Int. Cl.

| | |
|---|---|
| ***B01D 24/40*** | (2006.01) |
| ***B01D 35/02*** | (2006.01) |
| ***B01D 37/00*** | (2006.01) |
| ***C02F 1/00*** | (2023.01) |
| ***C02F 103/00*** | (2006.01) |

(52) U.S. Cl.
CPC ........... *B01D 24/402* (2013.01); *B01D 35/02* (2013.01); *B01D 37/00* (2013.01); *C02F 1/001* (2013.01); *B01D 2201/10* (2013.01); *B01D 2201/307* (2013.01); *B01D 2201/4038* (2013.01); *B01D 2201/4084* (2013.01); *B01D 2201/4092* (2013.01); *C02F 2103/001* (2013.01)

(56) References Cited

U.S. PATENT DOCUMENTS 217,906 A * 7/1879 Shaler ................... B01D 29/111 210/460
432,793 A * 7/1890 Crocker ................. B01D 35/02 210/312
530,816 A * 12/1894 Wright .................... E02D 29/12 210/247
622,217 A * 4/1899 Fuller et al. ........... B01D 35/02 D23/209
1,033,587 A * 7/1912 Hodgman ................ G02B 6/52 254/134.4
1,035,994 A * 8/1912 Mueller ................... G02B 6/52 15/104.061
1,115,016 A * 10/1914 Pheils ................... B65F 1/1447 193/11
1,155,852 A * 10/1915 Westergren ............ B01D 35/02 210/463
1,177,629 A * 4/1916 Johnson .................. E03F 9/002 15/104.31
1,178,355 A * 4/1916 Stein ...................... B01D 29/15 294/68.21
1,207,776 A * 12/1916 Mcdonald ............... B04B 11/04 210/324
1,458,464 A * 6/1923 De Forest .............. B01D 35/02 210/497.3
1,585,418 A * 5/1926 Rosenberg ............. B01D 35/02 210/485
1,746,121 A * 2/1930 Levy ......................... E03F 5/14 210/237
1,908,933 A * 5/1933 Tinello ................... B01D 35/04 210/489
1,961,498 A * 6/1934 Krueger ................. B01D 35/02 210/497.3
2,068,837 A * 1/1937 Aronson ................ B01D 35/02 55/482
2,102,310 A * 12/1937 Egan ..................... E03F 5/0404 210/247
2,263,259 A * 11/1941 Edward ................... E03C 1/282 137/247.35
2,384,057 A * 9/1945 Wetherell ............... B01D 35/02 210/489
2,414,487 A * 1/1947 Schuttler ................... B07B 1/50 210/474
2,481,152 A * 9/1949 Redmond, Sr. ....... B08B 9/0436 15/104.31
2,508,659 A * 5/1950 Brown .................... B08B 9/055 15/104.31
2,728,553 A * 12/1955 Edwards ............... E21B 49/005 175/308
2,728,599 A * 12/1955 Moore .................... E21B 27/00 294/86.11
2,735,122 A * 2/1956 Pletcher .................. E03F 9/002 134/8
2,761,529 A * 9/1956 Wisenbaugh ......... B60T 17/002 55/482
2,858,556 A * 11/1958 Hendrikus .............. B08B 9/049 15/104.31
2,942,668 A * 6/1960 Maly ................... E21B 33/1208 166/227
3,011,644 A * 12/1961 Mankin .................. B01D 29/23 210/453
3,280,982 A * 10/1966 Barto ...................... F16L 55/24 210/446
3,282,430 A * 11/1966 Kinne .................... A01G 25/00 210/162
3,303,525 A * 2/1967 Peoples ................... F16L 55/46 15/104.062
3,322,282 A * 5/1967 Lyman ................ A47L 15/4206 210/418
3,556,298 A * 1/1971 Werner ................ B01D 35/147 210/493.1
3,724,669 A * 4/1973 Thal ....................... B01D 29/15 210/409
3,804,258 A * 4/1974 Okuniewski ........... B01D 29/23 285/259
3,815,748 A * 6/1974 Johannessen ............. E03F 5/02 210/163
3,984,330 A * 10/1976 Nichols ................ B01D 29/232 210/460
3,992,886 A * 11/1976 Scott ....................... E02B 13/00 405/36
4,003,836 A * 1/1977 Stearns ................ B01D 29/114 210/247
4,198,220 A * 4/1980 Keller .................... B01D 45/06 55/DIG. 37
4,267,043 A * 5/1981 Benson ................ B01J 19/2435 210/DIG. 5
4,268,390 A * 5/1981 Cunningham ........ B01D 29/111 55/374
4,301,011 A * 11/1981 Stamm ................... B01D 35/02 210/447
4,328,098 A * 5/1982 Benson .................. B01D 29/54 210/405
4,419,232 A * 12/1983 Arntyr .................... E03C 1/262 210/170.03
4,582,605 A * 4/1986 Rea ........................ B01D 29/35 210/450
4,689,145 A * 8/1987 Mathews ............... B01D 29/56 210/260
4,699,163 A * 10/1987 Baziuk .................. B08B 9/0495 239/560
4,715,747 A * 12/1987 Behrens .................. F16L 55/48 405/303
4,860,805 A * 8/1989 Townsend ............ A47C 27/085 210/485
4,882,055 A * 11/1989 Stamstad ............... B01D 29/13 264/328.14
4,935,132 A * 6/1990 Schaier .............. B01D 17/0202 210/485
5,037,541 A * 8/1991 Ruey-Jang ................ E03F 5/06 210/155
D320,839 S * 10/1991 Froud .......................... D23/209
5,069,722 A * 12/1991 Murphy ................ B08B 9/0436 134/22.12
5,107,635 A * 4/1992 Carpenter ............. E04D 13/076 52/12
5,178,752 A * 1/1993 McKinnon ............. B01D 29/27 210/474
5,284,581 A * 2/1994 Benson .................. B01D 29/52 210/194
5,286,376 A * 2/1994 Benson ................... B08B 9/055 210/194
5,342,144 A * 8/1994 McCarthy ................. E03F 1/00 405/39
5,364,473 A * 11/1994 Van Der Does ........ B08B 9/055 134/22.12
5,366,009 A * 11/1994 Cornette ................. E21B 43/08 166/205
5,372,714 A * 12/1994 Logue, Jr. ............. E03F 5/0404 404/5

(56) References Cited

U.S. PATENT DOCUMENTS 5,403,474 A * 4/1995 Emery .................... E03F 5/046 210/474
5,405,539 A * 4/1995 Schneider ............. E03F 5/0404 210/170.03
5,427,680 A * 6/1995 Benson .................. B01D 29/52 210/194
5,454,275 A * 10/1995 Kabis .................... E21B 49/082 166/162
5,511,904 A * 4/1996 Van Egmond .......... E03F 1/002 405/36
5,575,925 A * 11/1996 Logue, Jr. ............. E03F 5/0404 404/5
5,580,393 A * 12/1996 Lawther ................ B08B 9/0436 134/8
5,587,072 A * 12/1996 Regan .................... B01D 29/54 405/36
5,676,848 A * 10/1997 Benson .............. B01D 29/6423 210/791
5,820,762 A * 10/1998 Bamer .................. E03F 5/0404 210/255
5,868,858 A * 2/1999 Creed .................. B08B 9/0436 15/345
5,888,407 A * 3/1999 Benson ................... B08B 9/055 210/791
5,915,395 A * 6/1999 Smith ..................... B08B 9/032 134/22.12
5,980,740 A * 11/1999 Harms ...................... E03F 5/14 210/170.03
6,056,211 A * 5/2000 DiLoreto .................. E03B 9/02 239/518
6,070,417 A * 6/2000 Benson .................. A23B 2/803 62/342
6,086,758 A * 7/2000 Schilling ............ B01D 39/1623 210/485
6,106,706 A * 8/2000 Roy .......................... E03F 1/00 210/136
6,106,707 A * 8/2000 Morris ................... B01D 17/00 210/337
6,143,254 A * 11/2000 Erven ..................... F01N 1/083 422/168
6,200,484 B1 * 3/2001 McInnis ................ E03F 5/0401 210/170.03
6,214,216 B1 * 4/2001 Isaacson ................... E03F 1/00 210/162
6,254,770 B1 * 7/2001 Remon ................. E03F 5/0404 210/163
6,274,036 B1 * 8/2001 Ellis ....................... B01D 29/27 210/474
6,294,095 B1 * 9/2001 Lewis ....................... E03F 1/00 210/477
6,299,764 B1 * 10/2001 White ................... E03F 5/0406 210/164
6,334,953 B1 * 1/2002 Singleton ............... B01D 29/27 405/36
6,358,405 B1 * 3/2002 Leahy ....................... E03F 5/14 210/170.03
6,412,135 B1 * 7/2002 Benson ................... B08B 9/055 15/104.062
6,428,692 B2 8/2002 Happel
6,443,312 B1 * 9/2002 Racine ................. B01D 29/118 210/414
6,478,954 B1 * 11/2002 Turner, Jr. ................ E03F 5/12 210/170.03
6,508,261 B1 * 1/2003 Nezat, II ................. E03F 9/002 134/167 C
6,517,709 B1 * 2/2003 Cardwell .................. E03F 1/00 210/170.03
6,521,122 B1 * 2/2003 Elliot .................... E03F 5/0404 210/170.03
6,523,554 B1 * 2/2003 Bryant, Sr. ............... E03F 9/00 210/162
6,537,447 B2 * 3/2003 Remon ................... E02D 29/12 210/163
6,554,997 B1 * 4/2003 Schilling ................ B01D 29/23 210/485
6,627,089 B1 * 9/2003 Wilkinson ............ B08B 9/0325 134/22.12
6,637,601 B2 * 10/2003 Mossip ............. B01D 29/6484 210/407
6,656,366 B1 * 12/2003 Fung ....................... B08B 9/055 210/194
6,749,746 B2 * 6/2004 Mokrzycki ............ B01D 36/04 210/170.03
6,793,811 B1 * 9/2004 Fleischmann ............. E03F 1/00 210/170.03
6,841,007 B1 * 1/2005 Howard .................. B08B 9/055 15/104.062
6,865,933 B1 * 3/2005 Einarson ............... E21B 49/081 73/864.33
6,866,153 B2 * 3/2005 Turner, Jr. ............ B01D 29/27 210/162
6,875,345 B2 * 4/2005 Hannah ..................... E03F 5/14 210/162
6,884,343 B2 * 4/2005 Harris .................. B01D 29/014 210/163
6,974,540 B1 * 12/2005 Fleischmann ............. E03F 1/00 210/163
6,998,039 B2 * 2/2006 Harris ....................... E03F 1/00 210/474
7,014,755 B2 * 3/2006 Muir ......................... E03F 1/00 210/283
7,112,274 B1 * 9/2006 Sanguinetti ............ B01D 29/01 210/474
7,125,823 B2 * 10/2006 Manzone ............. B01J 20/3246 502/402
7,128,832 B2 * 10/2006 Wade ........................ E03B 3/02 210/162
7,132,045 B1 * 11/2006 Trangsrud ............. E03F 5/0404 210/474
7,163,635 B2 * 1/2007 Fitzgerald ............. E03F 5/0404 210/170.03
7,186,333 B2 * 3/2007 Kluge ....................... E03F 1/00 210/691
7,201,843 B2 * 4/2007 Sasaki .................... B01D 29/27 210/478
7,229,559 B2 * 6/2007 Manzone ............. B01J 20/3007 210/660
7,270,747 B2 * 9/2007 Happel ..................... E03F 5/12 210/162
7,306,000 B1 * 12/2007 Nezat, II ................. B08B 9/053 134/166 C
7,309,420 B1 * 12/2007 Trangsrud ................. E03F 1/00 210/170.03
D563,161 S * 3/2008 Bodum .......................... D7/400
7,485,218 B2 * 2/2009 Dussich .................... E03F 1/00 210/255
7,524,414 B1 * 4/2009 Barragan .................. E03F 1/00 210/170.03
7,540,953 B2 * 6/2009 Fitzgerald ............... C02F 1/004 210/170.03
7,785,516 B2 * 8/2010 Malkin .................. B01D 29/15 264/DIG. 48
7,815,800 B2 * 10/2010 Komatsu ............ B01D 17/0214 210/462
7,837,869 B2 * 11/2010 Peters, Jr. ............ E03F 5/0404 210/170.03
7,875,178 B2 * 1/2011 Ashliman ............ B01D 24/007 210/477
7,959,799 B2 * 6/2011 Happel ..................... E03F 1/00 210/166
7,981,283 B2 * 7/2011 Happel ..................... E03F 5/14 210/162
8,012,346 B2 * 9/2011 Peters, Jr. ................ E03F 1/00 210/170.03
8,168,064 B2 * 5/2012 Peters, Jr. ................. E03F 5/06 210/170.03

(56) References Cited

U.S. PATENT DOCUMENTS

| | | | | |
|---|---|---|---|---|
| 8,221,632 | B2 * | 7/2012 | McInnis | E03F 5/0404 210/170.03 |
| 8,221,813 | B2 * | 7/2012 | Boul | A47J 31/08 426/594 |
| 8,277,646 | B2 * | 10/2012 | Singleton | C02F 1/006 210/163 |
| 8,366,923 | B1 * | 2/2013 | Happel | E03F 5/14 210/170.03 |
| 8,409,311 | B2 * | 4/2013 | Jessberger | B01D 46/0012 55/377 |
| 8,491,797 | B1 * | 7/2013 | Happel | E03F 5/14 210/170.03 |
| 8,534,467 | B2 * | 9/2013 | Haas | E03B 7/07 285/354 |
| 8,608,956 | B2 * | 12/2013 | Moulton | E03F 5/0404 210/473 |
| 8,623,203 | B2 * | 1/2014 | Peters, Jr. | B01D 29/902 210/170.03 |
| 8,652,323 | B2 * | 2/2014 | Dorsey | E03F 5/14 210/164 |
| 8,679,329 | B2 * | 3/2014 | Vreeland | E03F 5/0404 210/170.03 |
| 8,906,232 | B2 * | 12/2014 | McInnis | E03F 5/14 210/170.03 |
| 8,974,604 | B2 * | 3/2015 | Baziuk | B08B 9/0433 134/22.12 |
| 8,974,665 | B2 * | 3/2015 | Vreeland | E03F 5/14 210/170.03 |
| 8,980,084 | B2 * | 3/2015 | Dorsey | E03F 5/06 210/163 |
| 9,045,891 | B2 * | 6/2015 | Peters, Jr. | B01D 29/902 |
| 9,051,192 | B2 * | 6/2015 | Kent | E03F 5/041 |
| 9,187,890 | B2 * | 11/2015 | Semba | B01D 29/445 |
| 9,194,116 | B2 * | 11/2015 | Bailey | E03F 5/0404 |
| 9,322,156 | B2 * | 4/2016 | McInnis | E03F 5/0403 |
| D760,537 | S * | 7/2016 | Hertaus | D7/400 |
| D764,864 | S * | 8/2016 | Hertaus | D7/400 |
| 9,593,477 | B1 * | 3/2017 | Stivers | C02F 3/04 |
| 9,624,658 | B2 * | 4/2017 | Hannah | E03F 5/14 |
| 9,630,127 | B2 * | 4/2017 | Hoots | B01D 29/27 |
| 9,695,584 | B2 * | 7/2017 | Moran | E03F 5/16 |
| 9,982,418 | B2 * | 5/2018 | Bennett | E03B 7/095 |
| 9,999,848 | B2 * | 6/2018 | Morgan, III | B01D 29/25 |
| 9,999,849 | B2 * | 6/2018 | Morgan, III | B01D 29/27 |
| 10,202,871 | B2 * | 2/2019 | Ryon | F02C 7/222 |
| 10,287,769 | B2 * | 5/2019 | Fink | B01D 21/0012 |
| 10,384,155 | B1 * | 8/2019 | DiLalla | E03F 5/0404 |
| 10,391,427 | B2 * | 8/2019 | Dani | B01D 29/96 |
| 10,422,119 | B2 * | 9/2019 | Coppola | B01D 29/118 |
| 10,428,636 | B2 * | 10/2019 | Rogers | E21B 27/005 |
| 10,465,371 | B2 * | 11/2019 | Wacome | E03F 5/0404 |
| 10,508,430 | B2 * | 12/2019 | Riley | E03F 5/0404 |
| 10,533,400 | B2 * | 1/2020 | Rogers | B01D 17/045 |
| 10,597,862 | B1 * | 3/2020 | Downare | C02F 1/001 |
| 10,662,637 | B2 * | 5/2020 | Moran | B01D 21/0039 |
| 10,786,761 | B2 * | 9/2020 | Ismert | B01D 21/0006 |
| 10,786,765 | B2 * | 9/2020 | DiLalla | B01D 29/27 |
| 10,794,794 | B2 * | 10/2020 | Bowdle | G01M 9/065 |
| 10,844,588 | B1 * | 11/2020 | Riley | E03F 5/14 |
| 10,882,772 | B1 * | 1/2021 | Wensel | E03F 5/101 |
| 11,096,386 | B2 * | 8/2021 | Deurloo | E03F 5/042 |
| 11,186,980 | B2 * | 11/2021 | Yeoman | E03F 5/0404 |
| 11,224,830 | B2 * | 1/2022 | Wildermuth | B01D 29/96 |
| 11,312,647 | B1 * | 4/2022 | Wensel | E03F 5/0404 |
| 11,325,062 | B2 * | 5/2022 | Gannon | B01D 17/10 |
| 11,326,336 | B2 * | 5/2022 | Zarraonandia | E03F 1/002 |
| 11,346,094 | B2 * | 5/2022 | Lee | B01D 35/1435 |
| 11,414,852 | B2 * | 8/2022 | Kent | A61K 38/2013 |
| 11,459,744 | B2 * | 10/2022 | Swope | C02F 1/001 |
| 11,565,200 | B2 * | 1/2023 | Sahm | B01D 29/13 |
| 11,629,085 | B1 * | 4/2023 | Wensel | C02F 9/00 210/170.03 |
| 11,739,599 | B2 * | 8/2023 | Haymore | E21B 21/01 210/299 |
| 11,872,608 | B2 * | 1/2024 | Cheng | C02F 11/00 |
| 11,927,002 | B2 * | 3/2024 | Yazdani | E03C 1/264 |
| 11,969,675 | B2 * | 4/2024 | Okuno | B01D 29/902 |
| 12,018,426 | B1 * | 6/2024 | Trouba | D06F 39/10 |
| 12,044,000 | B2 * | 7/2024 | Friezner | B01D 35/02 |
| 12,059,638 | B2 * | 8/2024 | Sahm | B01D 29/21 |
| 12,134,886 | B2 * | 11/2024 | Coppola | B01D 29/27 |
| 12,138,570 | B2 * | 11/2024 | Gannon | B01D 17/0202 |
| 12,168,189 | B2 * | 12/2024 | Hart | B01D 35/02 |
| 12,180,817 | B2 * | 12/2024 | Trueheart | B01D 29/15 |
| 12,215,493 | B1 * | 2/2025 | Lawrence | E03F 1/002 |
| 12,427,455 | B2 * | 9/2025 | Hamkens | B01D 35/02 |
| 12,644,272 | B2 * | 6/2026 | Deurloo | E03F 5/0404 |
| 12,673,881 | B2 * | 7/2026 | McKee | C02F 1/001 |
| 12,674,729 | B2 * | 7/2026 | Earley | A47L 7/0014 |
| 2001/0030150 | A1 * | 10/2001 | Remon | E03F 1/00 210/163 |
| 2002/0096461 | A1 * | 7/2002 | Harris | E03F 1/00 210/162 |
| 2002/0113025 | A1 * | 8/2002 | Gauldin | E03F 5/0401 210/767 |
| 2002/0185422 | A1 * | 12/2002 | Turner, Jr. | B01D 21/02 210/162 |
| 2003/0000885 | A1 * | 1/2003 | Mossip | B01D 29/86 210/413 |
| 2003/0047497 | A1 * | 3/2003 | Harris | E03F 1/00 210/170.03 |
| 2003/0127380 | A1 * | 7/2003 | Morris | B01D 29/05 210/164 |
| 2003/0141230 | A1 * | 7/2003 | Mokrzycki | E03F 5/16 210/163 |
| 2003/0178349 | A1 * | 9/2003 | Bacon | B01D 35/02 210/232 |
| 2003/0192835 | A1 * | 10/2003 | Wilkinson | B08B 9/0325 210/194 |
| 2003/0201222 | A1 * | 10/2003 | Malkin | B01D 29/15 210/485 |
| 2004/0011731 | A1 * | 1/2004 | Sanguinetti | E03F 5/0404 210/483 |
| 2004/0016692 | A1 * | 1/2004 | Sasaki | B01D 29/27 210/473 |
| 2004/0045883 | A1 * | 3/2004 | Miller, Jr. | E03F 5/14 210/162 |
| 2004/0164026 | A1 * | 8/2004 | Manzone | B01J 20/26 210/668 |
| 2004/0226869 | A1 * | 11/2004 | McClure | E03F 5/0404 210/163 |
| 2005/0100409 | A1 * | 5/2005 | Houck | E03F 3/046 405/125 |
| 2005/0100412 | A1 * | 5/2005 | Houck | E03F 3/046 405/125 |
| 2005/0183997 | A1 * | 8/2005 | Happel | B01D 21/0012 210/163 |
| 2005/0199537 | A1 * | 9/2005 | Kluge | E03F 5/0404 210/164 |
| 2005/0230302 | A1 * | 10/2005 | Muir | B01D 35/04 210/290 |
| 2005/0230317 | A1 * | 10/2005 | Belasco | E03F 5/0404 210/163 |
| 2006/0163130 | A1 * | 7/2006 | Happel | E03F 5/14 210/163 |
| 2006/0169648 | A1 * | 8/2006 | Fitzgerald | E03F 1/00 210/170.03 |
| 2006/0207922 | A1 * | 9/2006 | Dussich | E03F 5/0404 210/164 |
| 2007/0181486 | A1 * | 8/2007 | Ashliman | B01D 29/54 210/485 |
| 2008/0093280 | A1 * | 4/2008 | Kang | E03F 5/0404 210/163 |
| 2008/0290042 | A1 * | 11/2008 | Hanson | E03F 5/0404 210/170.03 |
| 2009/0283463 | A1 * | 11/2009 | Kim | B01D 35/02 210/162 |

(56) References Cited

U.S. PATENT DOCUMENTS

2010/0059429 A1* 3/2010 Barry ..................... E04H 4/1254 210/167.1
2010/0116732 A1* 5/2010 Jung ....................... B01D 35/02 210/447
2010/0155336 A1* 6/2010 Simonson ............... B03C 1/286 210/695
2011/0000862 A1* 1/2011 Semba ...................... E03F 5/14 210/304
2011/0114195 A1* 5/2011 Haas ....................... F16L 55/24 137/15.01
2011/0132817 A1* 6/2011 Gardner ................. B01D 29/23 210/411
2011/0155672 A1* 6/2011 McInnis .................... E03F 5/04 210/166
2011/0278237 A1* 11/2011 McInnis .................... E03F 5/14 210/163
2012/0118802 A1* 5/2012 Takai ..................... B01D 35/02 210/170.03
2012/0145612 A1* 6/2012 McInnis ................ E03F 5/0404 210/163
2013/0020242 A1* 1/2013 Vreeland ............... E03F 5/0404 210/163
2013/0056399 A1* 3/2013 Downare .............. E03F 5/0404 210/170.03
2013/0118963 A1* 5/2013 Bailey ................... E03F 5/0404 137/15.01
2013/0186811 A1* 7/2013 Kaiser ................... E03F 5/0404 210/163
2013/0193045 A1* 8/2013 Vreeland ................... E03F 5/14 210/170.03
2013/0292317 A1* 11/2013 Shaw .................... E03F 5/0404 210/283
2013/0299402 A1* 11/2013 Rogahn ................. E03F 5/0404 210/163
2013/0299435 A1* 11/2013 Coffman ................. E03F 1/001 210/170.03
2013/0341287 A1* 12/2013 Panousis ................. E02B 5/085 210/747.6
2014/0001744 A1* 1/2014 Haas ...................... B01D 35/02 285/5
2014/0027362 A1* 1/2014 Kent ..................... E03F 5/0404 210/170.03
2014/0064840 A1* 3/2014 McInnis .................... F16B 2/04 403/374.3
2014/0110348 A1* 4/2014 Moran ............... B01D 21/0045 210/741
2014/0124422 A1* 5/2014 Dorsey ................... E03F 5/046 210/163
2014/0138298 A1* 5/2014 Schoepf ................ E03F 5/0404 210/170.03
2014/0238915 A1* 8/2014 McInnis ................ E03F 5/0404 210/170.03
2014/0246379 A1* 9/2014 McInnis .................... E03F 1/00 210/747.3
2014/0374332 A1* 12/2014 Hannah ..................... E03F 5/14 210/170.03
2015/0071716 A1* 3/2015 Regenauer ................ E02B 3/02 405/302.6
2015/0354242 A1* 12/2015 Saccoccio ............. B01D 29/50 210/806
2017/0145677 A1* 5/2017 Coppola ............... E03F 5/0404
2017/0211362 A1* 7/2017 Rogers ................... B01D 29/03
2017/0348620 A1* 12/2017 Rastegar ................. C02F 1/001
2018/0023280 A1* 1/2018 Hannah .................. A01G 9/026 210/170.03
2018/0023281 A1* 1/2018 Coppola ............... E03F 5/0404 210/163
2018/0023282 A1* 1/2018 Coppola ............... E03F 5/0404 210/163
2018/0112386 A1* 4/2018 Coppola ................... E03F 5/16
2018/0264382 A1* 9/2018 Dani ...................... B01D 27/08
2018/0266231 A1* 9/2018 Rogers .................... E21B 43/10
2019/0151781 A1* 5/2019 Rastegar ................ B01D 29/96
2019/0203457 A1* 7/2019 Peters, Jr. .............. B01D 29/13
2019/0292766 A1* 9/2019 Riley .................... E03F 5/0404
2019/0358564 A1* 11/2019 DiLalla ................. E03F 5/0404
2019/0390451 A1* 12/2019 King ......................... E03F 5/14
2020/0054973 A1* 2/2020 Wildermuth ........... B01D 35/02
2020/0087909 A1* 3/2020 Kamand ................ B01D 29/35
2020/0215465 A1* 7/2020 Hart ....................... B01D 29/23
2020/0238200 A1* 7/2020 Ismert ................ B01D 21/0006
2020/0370290 A1* 11/2020 Yeoman ................ E03F 5/0404
2020/0406173 A1* 12/2020 Gannon ................. B01D 17/10
2021/0002886 A1* 1/2021 Coppola ................. C02F 1/004
2021/0087804 A1* 3/2021 Kent ...................... C07K 14/55
2021/0113951 A1* 4/2021 Oh ......................... B01D 46/71
2021/0252433 A1* 8/2021 Sahm ..................... B01D 29/13
2022/0112705 A1* 4/2022 Zarraonandia ..... B01D 21/0012
2022/0184535 A1* 6/2022 Okuno ................... B01D 35/02
2022/0213677 A1* 7/2022 Swope ................... B01D 35/02
2022/0249991 A1* 8/2022 Gannon ............. B01D 17/0202
2022/0298773 A1* 9/2022 Coppola ................... E03F 5/16
2022/0356694 A1* 11/2022 Sheets ...................... E03F 5/046
2022/0412068 A1* 12/2022 Latour .................. E03F 5/0404
2023/0018046 A1* 1/2023 Coppola ................ B01D 29/27
2023/0054583 A1* 2/2023 McKee ................... C02F 1/001
2023/0143016 A1* 5/2023 Sahm ...................... F16L 55/24 210/153
2024/0060408 A1* 2/2024 Trueheart ............... B01D 29/15
2024/0117622 A1* 4/2024 Coppola ................... E03F 5/16
2024/0139655 A1* 5/2024 Peters, Jr. ................. E03F 5/14
2024/0226786 A1* 7/2024 Hamkens ............... B01D 35/02
2024/0328141 A1* 10/2024 Friezner ................. B01D 35/02
2024/0399275 A1* 12/2024 Okuno ................. B01D 35/023
2025/0043562 A1* 2/2025 Coppola ................. E03F 5/046
2025/0129592 A1* 4/2025 Peters, Jr. ............. E03F 5/0404
2025/0375723 A1* 12/2025 Nehlen, III ............ B01D 36/02
2026/0002846 A1* 1/2026 Earley ................... A47L 7/0014
2026/0048346 A1* 2/2026 Nehlen, III ............ B01D 24/10
2026/0110166 A1* 4/2026 Huff ...................... E03F 5/0404
2026/0138056 A1* 5/2026 Swope ................. B01D 24/042

OTHER PUBLICATIONS

Storm Water Systems Inc.; StormX Netting Trash Trap; Available at https://stormwatersystems.com/stormx-netting-trash-trap/; 2020.
ACF Environmental; StormSack; Available at https://acfenironmental.com/products/inlet-protection/drop-inlet-post-construction/stormsack-2/; 2020.

* cited by examiner

IN-PIPE STORMWATER TREATMENT UNIT BEST MANAGEMENT PRACTICE (I-STUB)

This application claims priority to U.S. Provisional Application No. 63/722,196, filed 19 Nov. 2024, titled "In-Pipe Stormwater Treatment Unit Best Management Practice (I-STUB)" (Navy Case #212422).

FEDERALLY-SPONSORED RESEARCH AND DEVELOPMENT

The United States Government has ownership rights in the invention claimed herein. Licensing and technical inquiries may be directed to the Office of Research and Technical Applications, Naval Information Warfare Center Pacific, Code 72110, San Diego, CA, 92152; voice (619) 553-5118; NIWC_Pacific_T2@us.navy.mil. Reference Navy Case Number 212422.

BACKGROUND OF THE INVENTION

Urbanization and industrial activities have led to increased impervious surfaces, such as roads, rooftops, and parking lots, which significantly contribute to stormwater runoff. This runoff often carries various pollutants, including sediments, heavy metals, oils, and organic matter, from these surfaces into the stormwater drainage systems. Traditional stormwater management systems are primarily designed for flood control and often lack efficient mechanisms for pollutant removal. Consequently, untreated stormwater runoff can severely impact aquatic ecosystems, water quality, and public health. The need for effective stormwater management is underscored by stringent environmental regulations and growing awareness of water pollution issues. Current solutions, such as retention ponds, bioretention cells, and end-of-pipe treatment technologies, have limitations regarding space requirements, maintenance, and effectiveness. These traditional methods can be costly and challenging to retrofit in densely populated urban areas. There is a need for an improved stormwater filter.

SUMMARY

Described herein is a filter for removing contaminants from stormwater comprising a plurality of individual treatment units (ITUs) and a plurality of rigid linkage arms. Each ITU includes a perforated filter body having an inlet end and an outlet end. Each ITU further includes a filter bag deployed within the perforated body and connected to the inlet end such that all stormwater entering the inlet end is channeled into the filter bag. Each rigid linkage arm is configured to connect the inlet end of one ITU to the outlet end of a different ITU so as to form a chain of ITUs and rigid linkage arms. Each linkage arm is configured to connect two given ITUs so as to limit side-to-side movement of the given ITUs with respect to each other.

An embodiment of a filter for removing contaminants from stormwater in a drainage system is also described herein as comprising a perforated body, a filter bag, a first cap, a capture cone, and a linkage arm. The perforated body has an inlet end and an outlet end, each of which has a receiving post. The first cap comprises an open end and an attachment end. The first cap is configured such that when the attachment end is attached to the perforated body's inlet end the filter bag is secured to the perforated body such that stormwater entering the inlet end is routed into the filter bag. The capture cone is configured to attach to the open end of the first cap. The capture cone is made of a flexible material that is able to conform to bottom contours of the drainage system. The linkage arm is rigid and configured to attach onto either of the receiving posts such that movement of the perforated body with respect to the linkage arm perpendicular to a long axis of the linkage arm is minimal.

Also disclosed herein is a method for removing contaminants from stormwater in a drainage system comprising the following steps. One step provides for positioning a first of a plurality of ITUs along a bottom surface of the drainage system. Each ITU of the plurality of ITUs includes a perforated filter body having an inlet end and an outlet end. Each ITU further includes a filter bag deployed within the perforated body and connected to the inlet end such that all stormwater entering the inlet end is channeled into the filter bag. Another step provides for attaching a first rigid linkage arm to the first ITU. The first rigid linkage arm is configured to attach to the first ITU such that movement of the first ITU's perforated body with respect to the first rigid linkage arm perpendicular to a long axis of the first rigid linkage arm is minimal. Another step provides for pushing the first ITU and the first rigid linkage arm into the drainage system. Another step provides for attaching the plurality of ITUs via a plurality of rigid linkage arms in a same manner as the first rigid linkage arm is attached to the first ITU so as to create a chain of ITUs and rigid linkage arms. Another step provides for pushing the chain of ITUs and rigid linkage arms into the drainage system one ITU or rigid linkage arm at a time as each ITU or rigid linkage arm is attached to the chain of ITUs and rigid linkage arms. Another step provides for securing an inlet end of the chain of ITUs and rigid linkage arms to an inlet of the drainage system. Another step provides for pulling the chain of ITUs and rigid linkage arms out of the inlet of the drainage system after the stormwater has passed through the chain of ITUs and rigid linkage arms.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
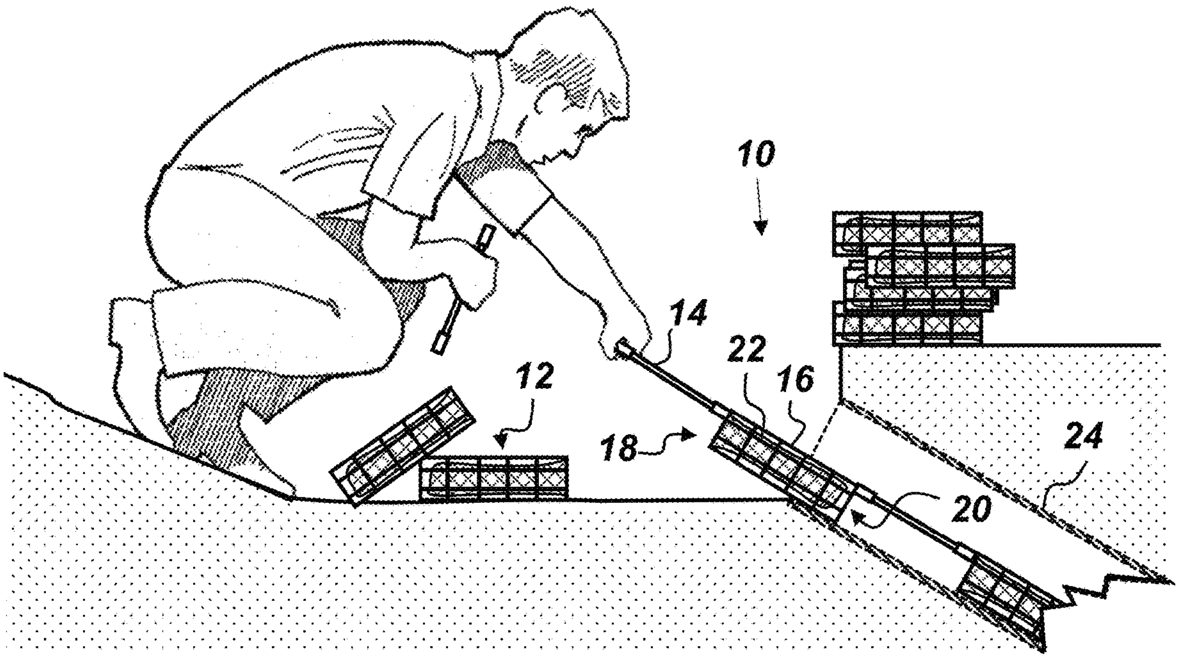
FIG. 1 is a side-view illustration of one embodiment of a filter for removing contaminants from stormwater.

FIG. 1 is a side-view illustration of an embodiment of a filter 10 for removing contaminants from stormwater comprising, consisting of, or consisting essentially of a plurality of ITUs 12 and a plurality of rigid linkage arms 14. Each ITU 12 includes a perforated filter body 16 having an inlet end 18 and an outlet end 20. Each ITU further includes a filter bag 22 deployed within the perforated body 16 and connected to the inlet end 18 such that all stormwater entering the inlet end 18 is channeled into the filter bag 22. Each rigid linkage arm 14 is configured to connect the inlet end 18 of one ITU to the outlet end 20 of a different ITU 12 so as to form a chain of ITUs and rigid linkage arms. Each linkage arm 14 is configured to connect two given ITUs 12 so as to limit side-to-side movement of the given ITUs with respect to each other. Filter 10 allows for the removal of stormwater contaminants from within the drainage system itself, such as the outfall pipe 24 shown in FIG. 1. The linkage arms 14 are rigid, allowing the filter 10 to be pushed into the drainage system. Other examples of drainage systems, with which the filter 10 may be used, include, but are not limited to outfall pipes, discharge pipes, and open channels.

Figure 2:
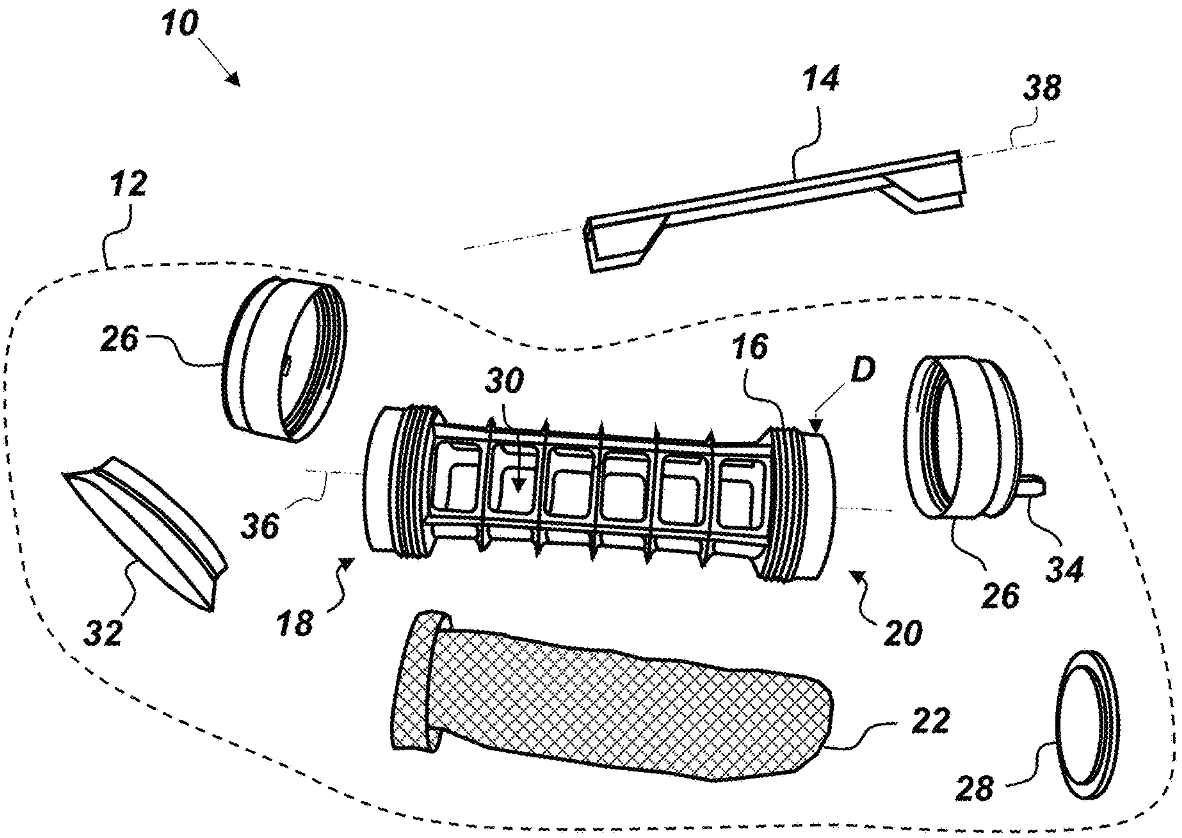
FIG. 2 is a perspective view of a disassembled embodiment of a filter for removing contaminants from stormwater.

FIG. 2 is a perspective view of a disassembled embodiment of the filter 10. The perforated filter body 16 is able to contain the filter bag 22, which may be, for example, an industry standard size four filter bag of any desired mesh size that accommodates high flow. The filter bag 22 may be used to add media to the filter 10 to remove a wide variety of contaminants from stormwater in the drainage system as it flows through the filter 10. In the embodiment of filter 10 shown in FIG. 2, the perforated body 16 is cylindrical and symmetrical such that either end may function as the inlet end 18 or the outlet end 20. Although the perforated body 16 is shown in FIG. 2 as being cylindrical, it is to be understood that each ITU may have any desired size and shape. The filter bag 22 may be secured in place on either end of the perforated body 16 by an end cap 26, which, in this embodiment, is open and may be screwed to the perforated body 16. An end plate 28 may be attached to whichever end of the perforated body 16 that is serving as the outlet end 20. Using a given end cap 26 to attach the end plate 28 to the outlet end 20 converts the given end cap 26 into a closed end cap and directs stormwater entering the inlet end 18 to exit the ITU 12 through the perforations 30 in the perforated body 16. Also shown in FIG. 2 is a capture cone 32 designed to be attached to the end cap 26 that connects to the inlet end 18. The capture cone 32 is flexible and able to conform to contours of the bottom of a drainage system and helps direct additional stormwater into the ITU 12 for treatment.

Figure 3A:
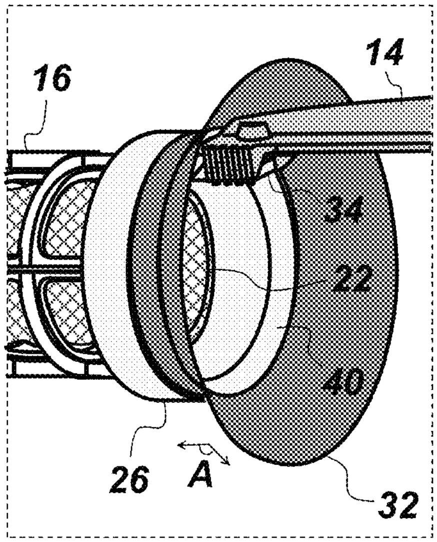
FIG. 3A is a perspective, partial view of an inlet end of an embodiment of an ITU.

FIG. 3A is a perspective, partial view of the inlet end 18 of an embodiment of the ITU 12. In this embodiment, the linkage arm 14 is designed to be snapped onto a receiving post 34 (also depicted in FIG. 2), which is part of the end cap 26. The linkage arm 14 may be reinforced to limit side-to-side movement as well as up-and-down movement of the ITUs 12 with respect to each other when linked together. In other words, each linkage arm 14 may be configured to attach onto a separate receiving post 34 such that a long axis 36 of the perforated body 16 is kept approximately parallel to a long axis 38 of the linkage arm 14. This design reduces side-to-side movement of the ITUs 12 allowing for more effective deployment when pushing the ITUs 12 into the drainage system (such as shown in FIG. 1). The chain of ITUs 12 and rigid linkage arms 14 may be pushed into the drainage system one ITU 12 or one rigid linkage arm 14 at a time as each ITU 12 or rigid linkage arm 14 is attached to the chain of ITUs 12 and rigid linkage arms 14. The rigidity of the linkage arms 14 is useful when pushing the filter 10 into the drainage system 24. In the embodiment of the ITU 12 shown in FIG. 3, a leading lip 40 of the end cap 26 is beveled to match an angle A of the capture cone 32.

Figure 3B:
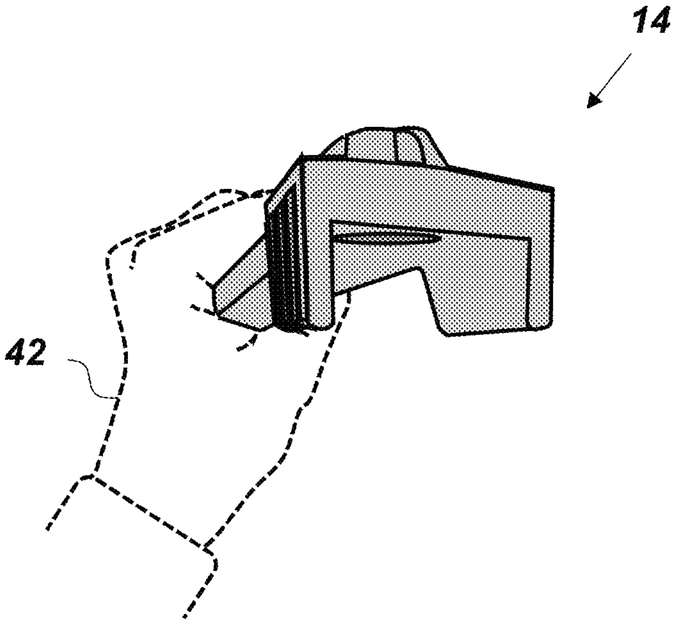
FIG. 3B is a perspective view of a hand holding an embodiment of a rigid linkage arm.

FIG. 3B is a perspective view of an end of an embodiment of the linkage arm 14 shown in FIG. 3A being held in a hand 42. In one example embodiment of the filter 10, each ITU 12 is approximately 45.72 cm (18 inches) long, with a diameter of approximately 11.43 cm (4.5 inches) or greater with perforations/windows 30 cut out along the longitudinal plane (as shown in FIG. 2) to allow maximum water flow while still providing structural support to the ITU 12. Different styles of filter bags 22 may be selected with different mesh sizes as desired. For example, it is preferable to have at least one filter bag selected with a focus on total suspended solids (TSS) and particulate metals removal. Other ITUs 12 may be equipped with filter bags 22 loaded with various media able to remove other contaminants such as dissolved metals and oil and grease from the stormwater. The mesh size and/or addition of media to the filter bags 22 and the ITU diameter D can be individualized to specific areas and contaminants, and outfall pipe diameter. The capture cone 32 may be removed from a cap 26 as desired. A series of multiple (e.g., 10-20) ITUs 12 can be attached with the rigid linkage arms 14 and deployed along a segment of pipe, depending on the outfall length. Ideally, the filter 10 should be deployed before a storm event(s), and retrieved after depending on the amount of precipitation. The ITUs 12 may be placed side-by-side along the bottom of an open channel drainage system in addition to within pipes.

Figure 4:
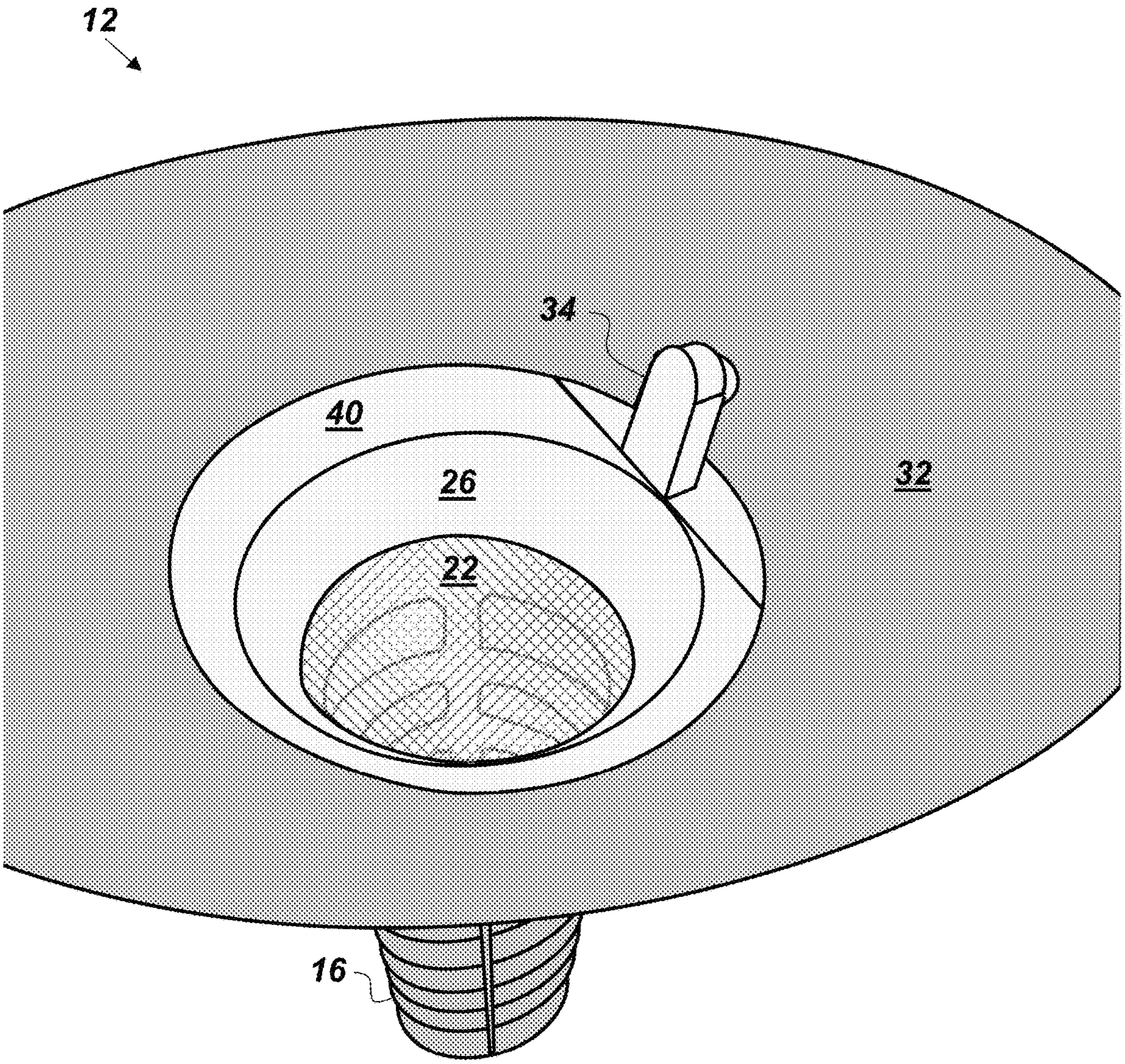
FIG. 4 is a perspective, partial view of an inlet end of an embodiment of an ITU.

FIG. 4 is a perspective, partial view of the inlet end 18 of an embodiment of the ITU 12 showing the receiving post 34 as part of the end cap 26. The beveled leading lip 40 and the capture cone 32 are also depicted in FIG. 4. Different embodiments of the ITU 12 may be snapped together to form the filter 10. For example, some ITUs 12 may have media added to their corresponding filter bags 22 to absorb different contaminants, while other ITUs 12 in the chain can have filter bags with different mesh sizes to capture/filter and array of contaminants from the stormwater.

Figure 5:
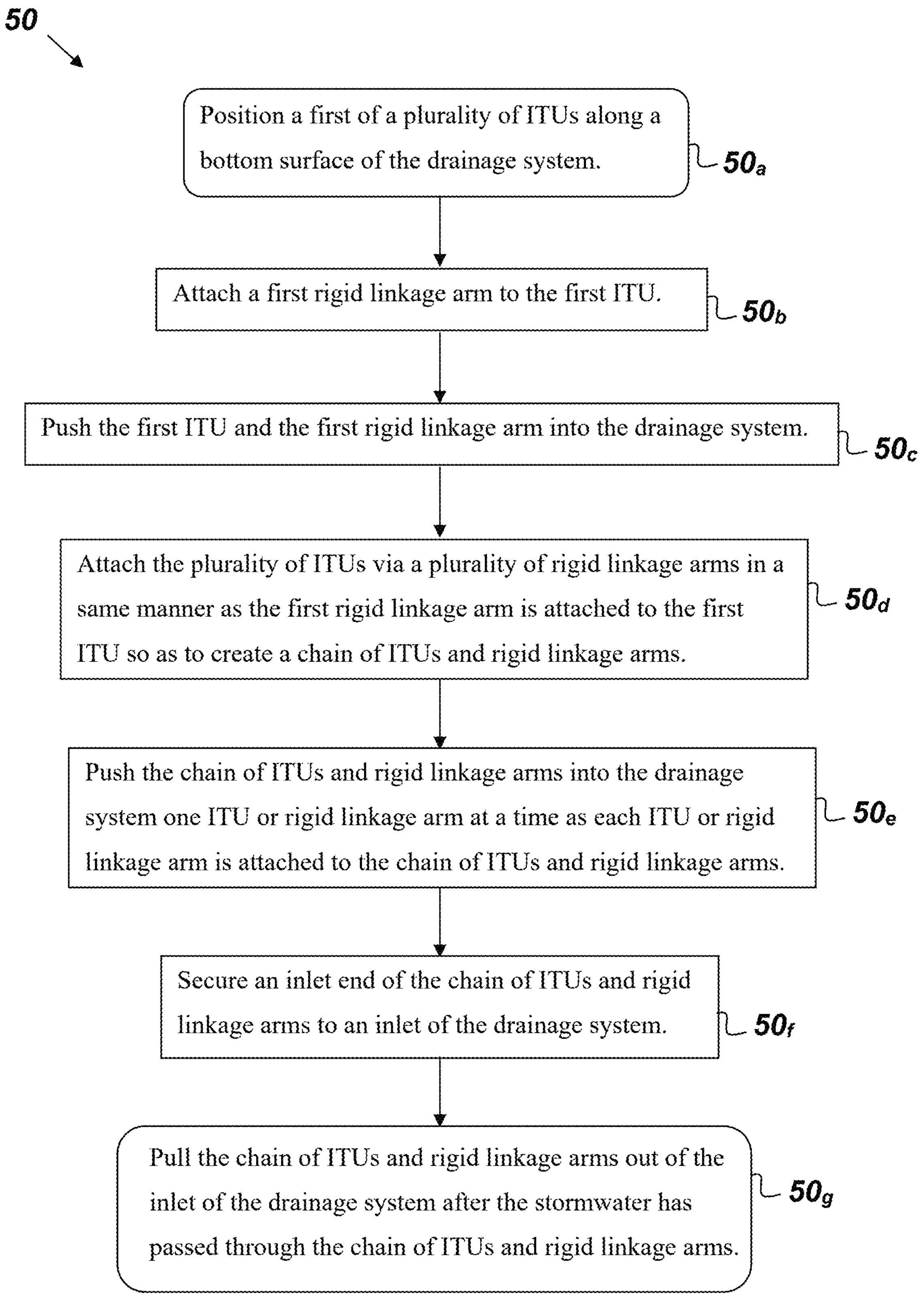
FIG. 5 is a flowchart of a method for using a filter to remove contaminants from stormwater.

FIG. 5 is a flowchart of a method 50 for removing contaminants from stormwater in a drainage system comprising the following steps. One step $50_a$ provides for positioning a first of a plurality of ITUs along a bottom surface of the drainage system. Each ITU of the plurality of ITUs includes a perforated filter body having an inlet end and an outlet end, and each ITU further includes a filter bag deployed within the perforated body and connected to the inlet end such that all stormwater entering the inlet end is channeled into the filter bag. Another step $50_b$ provides for attaching a first rigid linkage arm to the first ITU. The first rigid linkage arm is configured to attach to the first ITU such that movement of the first ITU's perforated body with respect to the first rigid linkage arm perpendicular to a long axis of the first rigid linkage arm is minimal (i.e., <10 degrees offset between the long axis of the ITU and the long axis of the linkage arm) Another step $50_c$ provides for pushing the first ITU and the first rigid linkage arm into the drainage system. Another step $50_d$ provides for attaching the plurality of ITUs via a plurality of rigid linkage arms in a same manner as the first rigid linkage arm is attached to the first ITU so as to create a chain of ITUs and rigid linkage arms. Another step $50_e$ provides for pushing the chain of ITUs and rigid linkage arms into the drainage system one ITU or rigid linkage arm at a time as each ITU or rigid linkage arm is attached to the chain of ITUs and rigid linkage arms. Another step $50_f$ provides for securing an inlet end of the chain of ITUs and rigid linkage arms to an inlet of the drainage system. A last step $50_g$ provides for pulling the chain of ITUs and rigid linkage arms out of the inlet of the drainage system after the stormwater has passed through the chain of ITUs and rigid linkage arms.

From the above description of the filter 10, it is manifest that various techniques may be used for implementing the concepts of filter 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that filter 10 is not limited to the particular embodiments described herein, but is capable of many embodiments without departing from the scope of the claims.

We claim:

1. A filter for placement within a stormwater drainage system for removing contaminants from stormwater comprising:
- a plurality of individual treatment units (ITUs), wherein each ITU includes:
  - an elongate perforated filter body having an inlet end and an outlet end; and
  - a filter bag that is open at one end, disposed within the perforated body with the open end positioned adjacent to, and connected to the inlet end such that all stormwater entering the inlet end is channeled into the filter bag; and
- a plurality of rigid linkage arms, wherein each rigid linkage arm is configured to connect the inlet end of one ITU to the outlet end of an adjacent ITU so as to form a chain of ITUs and rigid linkage arms, and wherein each linkage arm is configured to connect two given ITUs so as to limit relative axial movement of the given ITUs with respect to each other.

2. The filter of claim 1, wherein the elongate perforated body of each ITU is cylindrical.

3. The filter of claim 2, wherein the elongate perforated body of each ITU is symmetrical such that the inlet end and the outlet end are identical.

4. The filter of claim 3, wherein the inlet end and the outlet end of each ITU are open.

5. The filter of claim 4, wherein each ITU further comprises a closed end cap configured to be screwed onto the outlet end of each ITU such that when screwed on all stormwater entering the inlet end of the ITU must exit through perforations in the elongate perforated bodies of each ITU.

6. The filter of claim 5, wherein the rigid linkage arms are further configured to connect the ITUs together so as to limit up-and-down movement of the ITUs with respect to each other.

7. The filter of claim 6, wherein each ITU further comprises a capture cone configured to be attached to the inlet end of a corresponding ITU, wherein each capture cone comprises a flexible material configured to conform to a bottom surface of the stormwater drainage system and to route stormwater flowing down the drainage system into the inlet end of each ITU to which each capture cone is attached.

8. The filter of claim 7, wherein each rigid linkage arm is at least 50% as long as the length of each elongate perforated body.

9. The filter of claim 8, wherein the filter bag of each ITU is secured to the elongate perforated body by an open cap that screws onto a respective elongate perforated body, wherein the capture cone connects to the open cap, and wherein the open cap has a leading lip that is beveled to match an angle of the capture cone.

10. The filter of claim 9, wherein each rigid linkage arm comprises two ends, wherein each end is configured to snap onto a receiving post on either the inlet end or the outlet end of one of the ITUs.

11. The filter of claim 1, wherein the stormwater drainage system comprises an open channel.

12. The filter of claim 1, wherein the stormwater drainage system comprises a pipe.

13. A filter for removing contaminants from stormwater in a drainage system comprising:
- an elongate perforated body having an inlet end and an outlet end;
- an open-ended filter bag;
- a first cap comprising an open end and an attachment end, wherein the first cap is configured such that when the attachment end is attached to the inlet end of the elongate perforated body, the open-ended filter bag is secured to the elongate perforated body such that stormwater entering the inlet end is routed into the open-ended filter bag, and wherein the open end of the first cap comprises a first receiving post;
- a capture cone configured to be attached to the open end of the first cap, wherein the capture cone is made of a flexible material that is capable of conforming to bottom contours of the drainage system; and
- a rigid linkage arm configured to be attached to the first receiving post such that movement of the elongate perforated body with respect to the rigid linkage arm perpendicular to a longitudinal axis of the rigid linkage arm is limited.

14. The filter of claim 13, further comprising a second cap including a second receiving post, configured to be attached to the elongate perforated body's outlet end.

15. The filter of claim 14, further comprising a second rigid linkage arm configured to be attached to the second receiving post such that movement of the elongate perforated body with respect to the second rigid linkage arm perpendicular to a longitudinal axis of the second rigid linkage arm is limited.

16. The filter of claim 15, further comprising an end plate configured to seal an open end of the second cap.

17. The filter of claim 16, wherein the first and second caps are configured to be screwed onto either the inlet end or outlet end of the elongate perforated body.

18. The filter of claim 13, wherein the capture cone surrounds the receiving post.

19. The filter of claim 13, wherein the drainage system is an open channel.

20. A method for removing contaminants from stormwater in a drainage system comprising:

positioning a first of a plurality of individual treatment units (ITUs) along a bottom surface of the drainage system, wherein each ITU of the plurality of ITUs includes a perforated filter body having an inlet end and an outlet end, and wherein each ITU further includes a filter bag deployed within the perforated body and connected to the inlet end such that all stormwater entering the inlet end is channeled into the filter bag;

attaching a first rigid linkage arm to the first ITU, wherein the first rigid linkage arm is configured to attach to the first ITU such that movement of the first ITU's perforated body with respect to the first rigid linkage arm perpendicular to a longitudinal axis of the first rigid linkage arm is limited;

pushing the first ITU and the first rigid linkage arm into the drainage system;

attaching the plurality of ITUs via a plurality of rigid linkage arms in a same manner as the first rigid linkage arm is attached to the first ITU so as to create a chain of ITUs and rigid linkage arms;

pushing the chain of ITUs and rigid linkage arms into the drainage system one ITU or rigid linkage arm at a time as each ITU or rigid linkage arm is attached to the chain of ITUs and rigid linkage arms;

securing an inlet end of the chain of ITUs and rigid linkage arms to an inlet of the drainage system; and pulling the chain of ITUs and rigid linkage arms out of the inlet of the drainage system after the stormwater has passed through the plurality of ITUs.

* * * * *